US010873661B2

(12) United States Patent
Wang et al.

(10) Patent No.: US 10,873,661 B2
(45) Date of Patent: Dec. 22, 2020

(54) VOICE COMMUNICATION METHOD, VOICE COMMUNICATION APPARATUS, AND VOICE COMMUNICATION SYSTEM

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Qinghe Wang, Beijing (CN); Dongfang Wang, Beijing (CN); Tongshang Su, Beijing (CN); Leilei Cheng, Beijing (CN); Wei Song, Beijing (CN); Yang Zhang, Beijing (CN); Ning Liu, Beijing (CN); Haitao Wang, Beijing (CN); Jun Wang, Beijing (CN); Guangyao Li, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/388,827

(22) Filed: Apr. 18, 2019

(65) Prior Publication Data
US 2020/0106879 A1    Apr. 2, 2020

(30) Foreign Application Priority Data
Sep. 30, 2018 (CN) .......................... 2018 1 1160149

(51) Int. Cl.
*H04M 3/22* (2006.01)
*G06K 9/00* (2006.01)
(Continued)

(52) U.S. Cl.
CPC .......... *H04M 3/22* (2013.01); *G06K 9/00288* (2013.01); *G10L 17/00* (2013.01); *H04M 3/20* (2013.01)

(58) Field of Classification Search
CPC .... A61B 5/00; G06K 9/00288; G06K 7/1417; G06K 9/00892; G06Q 20/40;
(Continued)

(56) References Cited

U.S. PATENT DOCUMENTS 5,274,695 A * 12/1993 Green ................... G10L 17/22
379/127.01
5,353,336 A * 10/1994 Hou ..................... H04M 3/382
370/354
(Continued)

FOREIGN PATENT DOCUMENTS

CN    101321168 A    12/2008
CN    103346882 A    10/2013
(Continued)

OTHER PUBLICATIONS

First Chinese Office Action dated Apr. 30, 2020, received for corresponding Chinese Application No. 201811160149.0, 30 pages.

*Primary Examiner* — Gerald Gauthier
(74) *Attorney, Agent, or Firm* — Kinney & Lange, P.A.

(57) ABSTRACT

A voice communication method, a voice communication apparatus, and a voice communication system are disclosed. The method includes: at a transmitting side, obtaining voice information; determining whether the voice information is uttered by a preset user, and transmitting the voice information to a peer device if it is determined that the voice information is uttered by the preset user, and prohibiting the transmission of the voice information otherwise; and at a receiving side, receiving voice information transmitted from a peer device; collecting a first environmental information, and determining whether the first environmental information
(Continued)

meets a voice output condition; outputting the voice information if it is determined that the first environmental information meets the voice output condition, and prohibiting the output of the voice information otherwise.

12 Claims, 6 Drawing Sheets

(51) Int. Cl.
  *H04M 3/20* (2006.01)
  *G10L 17/00* (2013.01)
(58) Field of Classification Search
  CPC ........ G06Q 20/18; G06Q 30/06; G10L 17/00;
      G10L 17/005; G10L 17/22; G10L 15/22;
      G10L 15/10; G10L 15/26; G10L 17/14;
      G10L 25/51; H04M 1/64; H04M 3/00;
      H04M 3/20; H04M 3/22; H04M 3/38;
      H04N 7/18; H04N 21/44218; H04L
      29/06; H04W 4/021; H04W 12/06; H04W
      12/0605
  USPC .... 379/88.01, 88.02, 88.03, 102.02; 381/57;
      704/9, 273, 275, 200, 232; 705/39;
      455/518; 715/728; 726/6, 7, 19;
      382/118, 209
  See application file for complete search history.

(56) References Cited

U.S. PATENT DOCUMENTS

| | | | | |
|---|---|---|---|---|
| 5,365,574 A * | 11/1994 | Hunt | ................ | G07C 9/33 379/88.02 |
| 5,384,833 A * | 1/1995 | Cameron | ................ | G10L 17/00 379/88.01 |
| 5,414,755 A * | 5/1995 | Bahler | ................ | G10L 17/22 379/189 |
| 5,465,290 A * | 11/1995 | Hampton | ................ | H04M 1/665 379/88.02 |
| 5,517,558 A * | 5/1996 | Schalk | ................ | G06F 21/40 379/88.02 |
| 5,704,009 A * | 12/1997 | Cline | ................ | G07C 9/257 704/275 |
| 5,719,921 A * | 2/1998 | Vysotsky | ................ | G10L 15/065 379/88.01 |
| 5,752,231 A * | 5/1998 | Gammel | ................ | G10L 17/00 704/200 |
| 7,006,605 B1 * | 2/2006 | Morganstein | ................ | G06F 21/32 379/88.01 |
| 7,242,751 B2 * | 7/2007 | Bushey | ................ | H04M 3/5166 379/88.01 |
| 7,657,005 B2 * | 2/2010 | Chang | ................ | H04M 3/5183 370/352 |
| 8,086,461 B2 * | 12/2011 | De Los Reyes | ...... | G10L 17/005 704/273 |
| 8,346,659 B1 * | 1/2013 | Mohsenzadeh | ........ | G06Q 20/40 705/39 |
| 8,374,324 B2 * | 2/2013 | Suryanarayana | ..... | H04W 12/06 340/5.82 |
| 8,391,445 B2 * | 3/2013 | Hoblit | ................ | H04M 1/57 370/352 |
| 9,516,165 B1 * | 12/2016 | Moore | ................ | G10L 15/22 |
| 9,607,138 B1 * | 3/2017 | Baldwin | ................ | G06F 21/32 |
| 9,888,112 B1 * | 2/2018 | Hodge | ................ | H04M 1/67 |
| 9,959,865 B2 * | 5/2018 | Dai | ................ | G10L 15/22 |
| 10,074,089 B1 * | 9/2018 | Rangaraj | ................ | G10L 17/06 |
| 10,210,869 B1 * | 2/2019 | King | ................ | H04W 4/90 |
| 10,346,675 B1 * | 7/2019 | Nagalla | ................ | G07F 19/203 |
| 10,432,618 B1 * | 10/2019 | Poder | ................ | H04L 9/12 |
| 10,498,882 B2 * | 12/2019 | Obaidi | ................ | G06F 21/32 |
| 10,601,821 B2 * | 3/2020 | Du | ................ | G06F 21/45 |
| 10,719,591 B1 * | 7/2020 | Krieger | ................ | H04L 63/0861 |
| 2002/0150298 A1 * | 10/2002 | Rajagopal | ................ | G06F 17/15 382/209 |
| 2003/0007690 A1 * | 1/2003 | Rajagopal | ................ | G06F 17/15 382/209 |
| 2006/0079261 A1 * | 4/2006 | Nakamura | ............ | H04W 76/45 455/518 |
| 2007/0106941 A1 * | 5/2007 | Chen | ................ | H04N 21/8113 715/728 |
| 2007/0189544 A1 * | 8/2007 | Rosenberg | ........... | G11B 27/105 381/57 |
| 2007/0294081 A1 * | 12/2007 | Wang | ................ | G10L 15/26 704/200 |
| 2010/0198583 A1 * | 8/2010 | Su | ................ | G10L 15/00 704/9 |
| 2013/0227678 A1 * | 8/2013 | Kang | ................ | G06K 9/00335 726/19 |
| 2014/0289834 A1 * | 9/2014 | Lindemann | ........ | G06Q 20/3278 726/7 |
| 2015/0049922 A1 * | 2/2015 | Miller | ................ | G06K 9/00288 382/118 |
| 2015/0134330 A1 * | 5/2015 | Baldwin | ................ | G10L 17/06 704/232 |
| 2015/0170672 A1 | 6/2015 | Liu | | |
| 2016/0057139 A1 * | 2/2016 | McDonough | ........... | H04L 67/02 726/6 |
| 2016/0059864 A1 | 3/2016 | Feit et al. | | |
| 2018/0039990 A1 * | 2/2018 | Lindemann | ............. | G06F 21/31 |
| 2018/0137865 A1 * | 5/2018 | Ling | ................ | G10L 15/08 |
| 2018/0165655 A1 * | 6/2018 | Marcelle | ................ | G06K 7/1417 |
| 2018/0286407 A1 * | 10/2018 | Katoh | ................ | G10L 17/00 |
| 2018/0325470 A1 * | 11/2018 | Fountaine | ............... | H04W 4/90 |
| 2019/0104340 A1 * | 4/2019 | Liu | ................ | H04N 21/4415 |
| 2019/0206412 A1 * | 7/2019 | Li | ................ | G10L 15/22 |
| 2019/0246075 A1 * | 8/2019 | Khadloya | ................ | G10L 25/51 |
| 2019/0268460 A1 * | 8/2019 | Agrawal | ................ | H04W 4/021 |
| 2020/0045041 A1 * | 2/2020 | Heidari | ................. | H04L 65/102 |
| 2020/0106879 A1 * | 4/2020 | Wang | ................ | G10L 17/005 |
| 2020/0265388 A1 * | 8/2020 | Marcelle | ................ | G06K 7/1417 |

FOREIGN PATENT DOCUMENTS

| | | |
|---|---|---|
| CN | 103577737 A | 2/2014 |
| CN | 104036778 A | 9/2014 |
| CN | 104715757 A | 6/2015 |
| CN | 105323670 A | 2/2016 |
| CN | 106210511 A | 12/2016 |
| CN | 106790961 A | 5/2017 |
| CN | 106973160 A | 7/2017 |
| CN | 107682547 A | 2/2018 |
| CN | 107682786 A | 2/2018 |
| CN | 107872555 A | 4/2018 |
| CN | 108551604 A | 9/2018 |
| DE | 102004026205 A1 | 1/2005 |
| JP | 0830743 A | 2/1996 |
| KR | 20020016509 A | 3/2002 |

* cited by examiner

VOICE COMMUNICATION METHOD, VOICE COMMUNICATION APPARATUS, AND VOICE COMMUNICATION SYSTEM

CROSS-REFERENCE TO RELATED APPLICATION(S)

This application claims priority to the Chinese Patent Application No. 201811160149.0, entitled "VOICE COMMUNICATION METHOD, VOICE COMMUNICATION APPARATUS, AND VOICE COMMUNICATION SYSTEM" and filed on Sep. 30, 2018, which is incorporated herein by reference in its entirety.

TECHNICAL FIELD

The present disclosure relates to the field of communication technology, and in particular, to a voice communication method, a voice communication apparatus, and a voice communication system.

BACKGROUND

In daily life, people often make voice calls. When people make voice calls, in many cases, they are in a relatively complicated voice environment, such as streets, stations and other crowded public places with a lot of noise.

At present, when users perform voice communication based on the existing voice communication methods, much of the voice information is sensitive personal information. However, in the above environment, the voice information of people during a voice call is likely to be obtained by other people around, which leads to the possibility that the voice information is leaked and stolen when people make a voice call at present. As a result, the security of voice calls is easy to be affected.

SUMMARY

The present disclosure provides a voice communication method applied to a transmitting side. The method includes: obtaining voice information; determining whether the voice information is uttered by a preset user; if so, transmitting the voice information to a peer device, and if not, prohibiting the transmission of the voice information.

Optionally, the determining whether the voice information is uttered by a preset user includes: determining whether audio features of the voice information are consistent with audio features of the preset user; and/or obtaining facial features of a person who utters the voice information, and determining whether the facial features are consistent with facial features of the preset user; and/or obtaining action features of the person who utters the voice information, and determining whether the action features are consistent with action features of the preset user.

Optionally, before the transmitting the voice information to the peer device, the method further includes: obtaining a voice environment in which the transmitting side is located, and performing optimization processing on the voice information according to the voice environment in which the transmitting side is located, wherein the optimization processing includes volume changing and/or noise reduction processing; the transmitting the voice information to the peer device includes: transmitting the optimized voice information to the peer device.

The present disclosure provides a voice communication method applied to a receiving side. The method includes: receiving voice information transmitted from a peer device; collecting a first environmental information, and determining whether the first environmental information meets a voice output condition; if so, outputting the voice information, and if not, prohibiting the output of the voice information.

Optionally, the collecting a first environmental information, and determining whether the first environmental information meets a voice output condition includes: determining whether there is only one voice recipient; and/or determining whether facial features of the voice recipient are consistent with facial features of a preset receiving user; and/or determining whether distances from other users than the voice recipient to the voice recipient exceed a preset threshold.

Optionally, the outputting the voice information includes: collecting a second environment information when the voice information is output; stopping outputting the voice information and switching to outputting a preset voice if it is determined that the second environment information does not meet a voice output condition; or outputting an interference superimposed voice if it is determined that the second environment information does not meet a voice output condition, the interfering superimposed voice being a voice in which interfering audio is superimposed on the voice information.

Optionally, the outputting the voice information includes: adjusting output volume of the voice information according to the first environment information, and outputting the adjusted voice information.

The present disclosure provides a voice communication apparatus applied to a transmitting side. The apparatus includes: an obtaining unit configured to obtain voice information; a determination unit configured to determine whether the voice information is uttered by a preset user; a transmitting unit configured to transmit the voice information to a receiving side if it is determined that the voice information is uttered by a preset user, and prohibit the transmission of the voice information if it is determined that the voice information is not uttered by a preset user.

Optionally, the obtaining unit is further configured to obtain facial features and action features of a person who utters the voice information; the determination unit includes: a first determination module configured to determine whether audio features of the voice information are consistent with audio features of the preset user; a second determination module configured to determine whether the facial features are consistent with facial features of the preset user; a third determination module configured to determine whether the action features are consistent with action features of a preset user.

Optionally, the apparatus further includes: a processing unit configured to obtain a voice environment in which the transmitting side is located, and perform optimization processing on the voice information according to the voice environment in which the transmitting side is located, wherein the optimization processing includes volume changing and noise reduction processing; the transmitting unit is further configured to transmit the optimized voice information to the peer device.

The present disclosure provides a voice communication apparatus applied to a receiving side. The apparatus includes: a receiving unit configured to receive voice information transmitted from a peer device; a determination unit configured to collect a first environmental information, and determine whether the first environmental information meets a voice output condition; an outputting unit configured to output the voice information if it is determined that the first environment information meets a voice output condition, and not output the voice information otherwise.

Optionally, the determination unit includes: a fourth determination module configured to determine whether there is only one voice recipient; a fifth determination module configured to determine whether facial features of the voice recipient are consistent with facial features of a preset receiving user; a sixth determination module configured to determine whether distances from other users than the voice recipient to the voice recipient exceed a preset threshold.

Optionally, the outputting unit includes: a collecting module configured to collect a second environment information when the voice information is output; an output switching module configured to stop outputting the voice information and switch to outputting a preset voice if it is determined that the second environment information does not meet a voice output condition; a first outputting module configured to output an interference superimposed voice if it is determined that the second environment information does not meet a voice output condition, the interfering superimposed voice being a voice in which interfering audio is superimposed on the voice information.

Optionally, the outputting unit further includes: an adjusting module configured to adjust output volume of the voice information according to the first environment information; a second outputting module configured to output the adjusted voice information.

The present disclosure provides a voice communication system comprising: a transmitting side and a receiving side; the transmitting side is configured to obtain voice information, determine whether the voice information is uttered by a preset user, and transmit the voice information to a receiving side if it is determined that the voice information is uttered by a preset user, and not transmit the voice information if it is determined that the voice information is not uttered by a preset user; the receiving side is configured to receive the voice information transmitted from the transmitting side, collect a first environmental information, determine whether the first environmental information meets a voice output condition, output the voice information if it is determined that the first environmental information meets the voice output condition, and not output the voice information otherwise.

The present disclosure provides a storage medium storing a computer program adapted to be loaded by a processor and perform the aforementioned voice communication method.

BRIEF DESCRIPTION OF THE DRAWINGS

By reading the detailed descriptions of the specific embodiments below, various other advantages and benefits will become apparent to those of ordinary skill in the art. The drawings are only for the purpose of illustrating some embodiments, and are not considered as a limitation of the disclosure. Throughout the drawings, the same reference numerals are used to refer to the same components. In the drawings.

DETAILED DESCRIPTION

Figure 1:
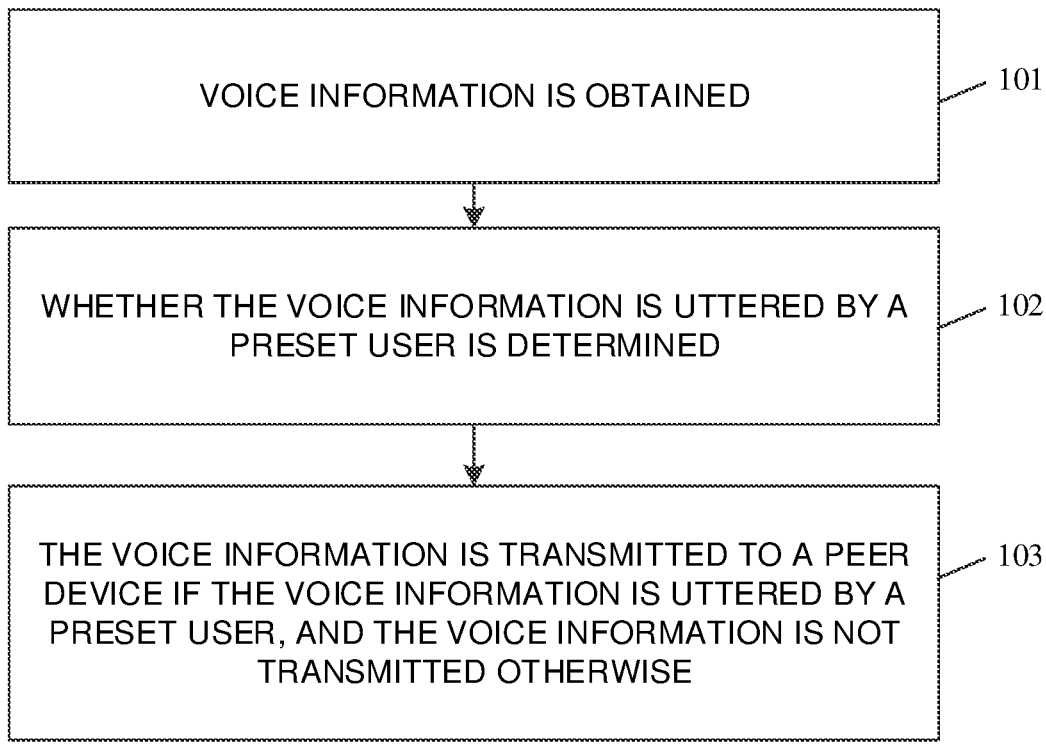
FIG. 1 illustrates a flowchart of a voice communication method according to an embodiment of the present disclosure.

Exemplary embodiments of the present disclosure will be described in more detail below with reference to the accompanying drawings. Although the exemplary embodiments of the present disclosure are shown in the drawings, it is to be understood that the present disclosure may be implemented in various forms and should not be limited by the embodiments set forth herein. Rather, these embodiments are provided so that this disclosure will be more fully understood and the scope of the disclosure will be fully conveyed to those of ordinary skill in the art.

It should be noted that, as used herein, the term "user" may refer to a human user, and may also refer to a non-human user, such as artificial intelligence, electronic equipment, and the like. Further, as used herein, the term "user's voice" may refer to a voice sound uttered by a human user, and may also refer to any sound generated by a non-human user, such as a recorded sound or music reproduced by a sound reproduction device, or a musical tone produced by an musical instrument, ambient noise, and the like.

The embodiment of the present disclosure provides a voice communication method applied to a transmitting side. As shown in FIG. 1, the method mainly includes steps 101 to 103.

101. Voice information is obtained.

In the embodiment of the present disclosure, when the transmitting side detects that there exists a voice in the external environment, the voice in the external environment, that is, the voice information in the embodiment of the present disclosure, may be obtained by a voice collecting unit deployed in the transmitting side. During the obtaining process, the voice collection unit may select a device that can be used for voice collection, such as a microphone or an electronic ear, to obtain the voice information. In the embodiment of the present disclosure, the detecting and obtaining of the voice information may be performed in any manner, which is not limited herein, and which may be selected according to requirements.

102. It is determined whether the voice information is uttered by a preset user.

In order to improve the security of voice communication and to avoid the influence of others on the security of the voice communication, in the embodiment of the present disclosure, after the voice information has been obtained in the foregoing step 101, the person who utters the voice information needs to be determined to detect whether the person is the owner or the holder of the device. Therefore, according to the present step of the method, it can be determined whether the voice information obtained in the foregoing step is uttered by a preset user.

Specifically, for determining whether the voice information is uttered by the preset user, it is possible to adopt, but not limited to, the following ways: for example, the determination may be made by using the audio in the currently obtained voice information. Specifically, audio features may be first extracted from the voice information and then compared with the pre-entered audio features of the owner, wherein the audio features of the owner may be extracted from a voice pre-entered by the user. Since each individual's audio features are different, the audio features of the current voice information may be compared with the pre-entered audio features of the owner. When the similarity exceeds a threshold set by the user, it is shown that the two voices are uttered by the same person, and then it is determined that the currently obtained voice information is indeed uttered by the preset user, and that the user who currently emits the voice in front of the transmitting side of the voice communication device is the preset user.

Certainly, in the embodiment of the present disclosure, the foregoing determining manner is only one implementation for determining whether the voice information is uttered by the preset user. The determining may also be performed in any other manner such as by determining the face or the behavior, for example, the action, which is not limited herein, and which may be selected according to requirements.

103. If the voice information is uttered by a preset user, the voice information is transmitted to a peer device; otherwise, the voice information is not transmitted.

Upon the determination of step 102, when it is determined that the voice information is indeed uttered by the preset user, it may be determined that the user who currently emits the voice is indeed the preset user, and that the voice may be transmitted. Accordingly, according to the present step of the method, the voice information may be transmitted to the receiving side corresponding to the transmitting side. For the transmission process and the transmission mode, any voice transmission mode may be selected, which may be wireless transmission or wired transmission. Here, the transmission mode and the transmission process are not specifically limited, and the implementation mode may be arbitrarily selected when the voice information is ensured to be accurate.

Upon the determination of step 102, when it is determined that the voice information is not uttered by the preset user, it may be determined that it is not the preset user who is currently emitting the voice, and that the voice information is not required to be transmitted. In this way, the problem of voice information leakage caused by other people impersonating the owner for voice communication may be avoided, and the security of the voice communication described in the embodiment of the present disclosure may be improved.

Therefore, according to the voice communication method applied to the transmitting side provided by the embodiment of the present disclosure, the transmitting side obtains voice information and determines whether the voice information is uttered by a preset user, and transmits the voice information when it is determined that the voice information is uttered by the preset user. In this way, the identity of the person who utters the voice information may be confirmed at the transmitting side, the problem that other people use voice device to affect the security of voice communication may be avoided, and the security of voice communication process may be improved as a whole. Moreover, when the voice information is not uttered by the preset user, the voice information is not transmitted, so that the problem of voice information leakage caused by other people impersonating the preset user to carry out voice communication may be avoided, at the same time, it can also avoid the transmission of independent voice information, thus reducing the overall power consumption, bandwidth consumption and other resources waste.

Figure 2:
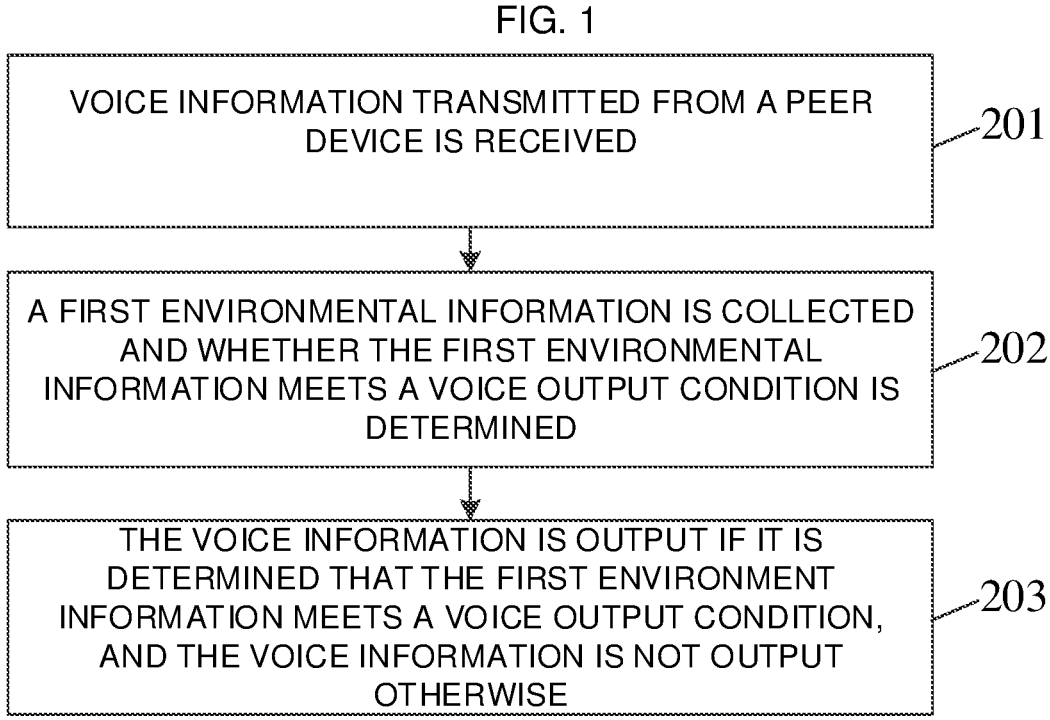
FIG. 2 illustrates a flowchart of another voice communication method according to an embodiment of the present disclosure.

As shown in FIG. 2, another embodiment of the present disclosure further provides a voice communication method applied to a receiving side. As shown in FIG. 2, the method mainly includes steps 201 to 203.

201: Voice information transmitted from a peer device is received.

In the embodiment of the present disclosure, the peer device may be the transmitting side in the foregoing embodiment. For the convenience of description, in the embodiment of the present disclosure, as the peer device of the receiving side, the transmitting side in the foregoing embodiment is taken as an example. Therefore, after the transmitting side transmits voice information, the voice information may be received by the receiving side. Specifically, any one of the wireless or wired reception may be selected as the receiving mode, and certainly, it is necessary to ensure that the receiving mode of voice information at the receiving side matches the transmitting mode at the transmitting side, so as to avoid the problem of data loss.

202. A first environment information is collected, and it is determined whether the first environment information meets a voice output condition.

After the voice information is received in the foregoing step 201, in order to improve the security of the voice communication, and to avoid the case where the voice information is eavesdropped or stolen by others when the voice information is output, it is necessary to determine, before the voice information is output, whether the current environment meets a condition for outputting the voice information. Therefore, according to the present step of the method, first the first environment information may be collected, and then it may be determined whether the current environment condition meets the preset voice output condition according to the first environment information. The voice output condition may be preset by the user before performing the voice communication, and is used to define whether the current situation satisfies the voice output condition. As a manner of determining whether the first environment information meets the voice output condition, the identity of the recipient may be identified by facial recognition of the voice recipient. Specifically, the face features on the face of the voice recipient currently located at the receiving side may be collected by a face recognition unit, and then compared with the facial features of a preset receiving user, and the consistency between the two may be determined based on the similarity between the two, thereby determining the identity of the recipient based on the facial features. Certainly, in the embodiment of the present disclosure, the manner of determining whether the first environment information meets the voice output condition includes not only the foregoing manner, but also other manners. For example, the number of current voice recipients at the receiving side, or the distances from other people in the vicinity of the recipient to the recipient may also be used to determine whether the external environment meets the condition for outputting the voice information. Here, the determination method and type are not specifically limited, and may be selected according to actual needs.

203. If it is determined that the first environment information meets a voice output condition, the voice information is output, and otherwise, the voice information is not output.

After the determination of the foregoing step 202, when it is determined that the first environment information meets the voice output condition, it is indicated that the influence of other people on the security of the voice information is currently excluded in the vicinity of the receiving side, and voice output may be performed. Therefore, the voice information may be output by a voice output unit. Specifically, the voice output unit may be any speaker for outputting voice, such as an external speaker or a headphone.

After the determination of the foregoing step 202, when it is determined that the first environment information does not meet the voice output condition, it is indicated that if the voice information is outputted in the current environment, there is a possibility that the voice information will be obtained by others. Therefore, according to the present step of the method, the output of the voice information may not be performed. Certainly, after receiving the voice information from the transmitting side, the voice information may be saved in a preset storage medium to ensure that the voice information is output when the first environment information meets the voice output condition.

Therefore, according to the voice communication method applied to the receiving side provided by the embodiment of the present disclosure, the receiving side obtains the first environment information, determines whether the voice output condition is met, and outputs the voice information when the voice output condition is met; otherwise, no voice information is output. In this way, it is possible to determine, at the receiving side, whether the current environment meets the voice output condition when the voice information is to be output, and then to output the voice information when the current environment meets the voice output condition. When the voice output condition is not met, the voice information is not outputted, which can avoid the possibility that the voice information is obtained by others, and then ensure the security of the whole voice communication process.

Figure 3:
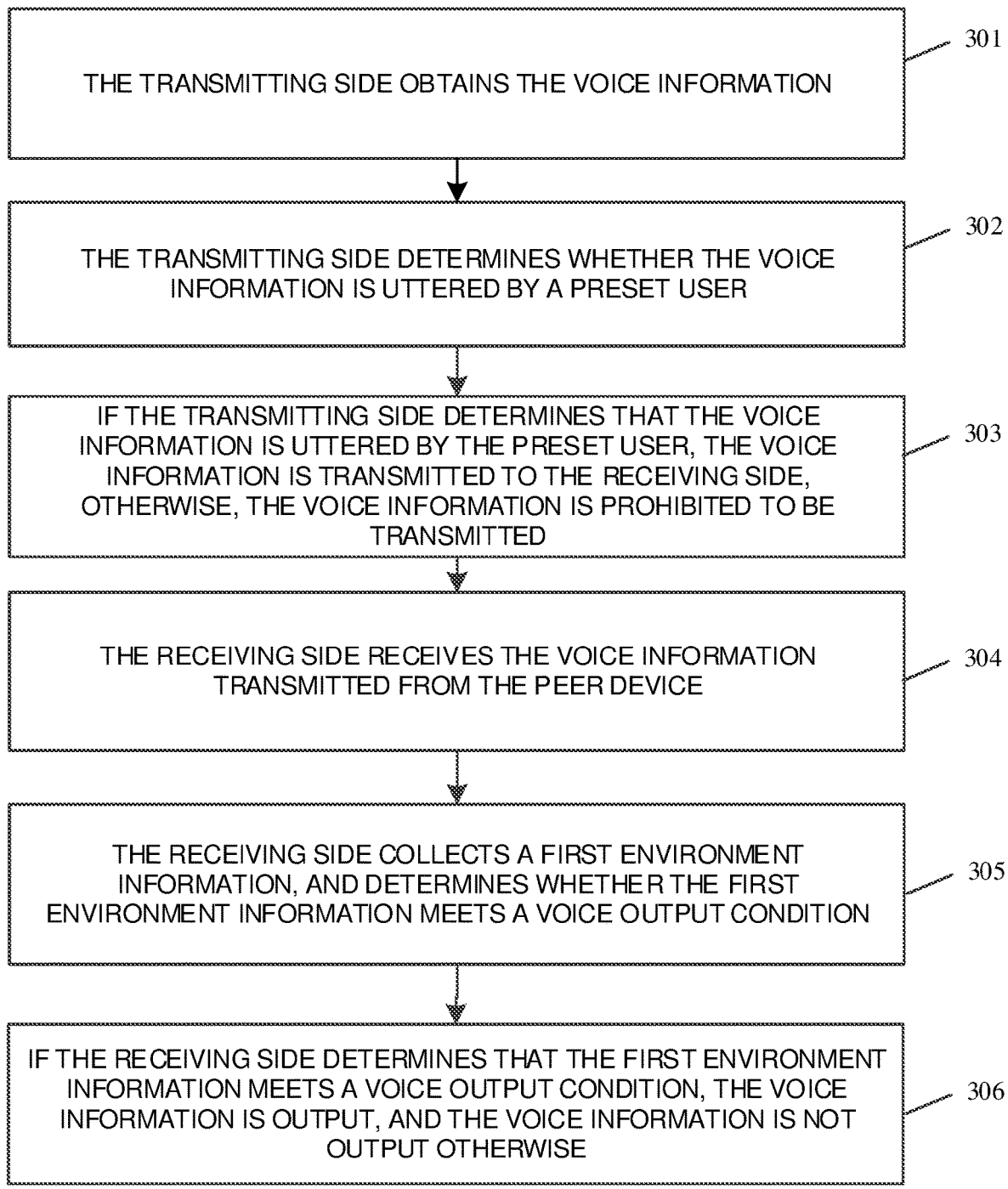
FIG. 3 illustrates a flowchart of still another voice communication method according to an embodiment of the present disclosure.

According to the method shown in FIG. 3, another embodiment of the present disclosure further provides a voice communication method, which is applied to a transmitting side and a receiving side respectively. As shown in FIG. 3, the method mainly includes steps 301 to 306.

301. The transmitting side obtains the voice information.

In the embodiment of the present disclosure, the voice information communication is performed on both the transmitting side and the receiving side. The process and the manner in which the transmitting side obtains the voice information are consistent with the description in step 101 in the foregoing embodiment, and will not be described in detail here. Specifically, when the voice information is obtained, any voice input device, such as a microphone, may be selected.

302. The transmitting side determines whether the voice information is uttered by a preset user.

After obtaining the voice information according to the foregoing step 301, in order to ensure that the current user of the transmitting side is indeed the owner or the user who is allowed to use the transmitting side of the voice communication, that is, the preset user, in the embodiment of the present disclosure, it is also necessary to determine and identify the obtained voice information to confirm whether the current voice information is uttered by the preset user.

Specifically, determining whether the voice information is uttered by the preset user may be performed according to the following manners.

In some examples, it is determined whether the audio features of the voice information are consistent with those of the preset user. Specifically, when performing the determination, the audio features may be extracted from the currently obtained voice information, and then compared with the pre-entered audio features of the preset user. Since each individual's audio features are different, it is possible to determine whether the current voice information is uttered by the preset user by comparing the audio features. When performing the determination, the voice may be collected by a voice input device provided on the transmitting side, and then transmitted to the corresponding information processor for determination and identification. Here, the information processor and the voice input device are not specifically limited herein, and may be selected according to actual needs.

In other examples, the facial features of the person who utters the voice information are obtained and it is determined whether the facial features are consistent with those of the preset user. Specifically, when performing the determination, the facial image of the current user in front of the transmitting side may be collected, and the features of the image, that is, the facial features of the person who utters the voice information, may be extracted therefrom. Then, the facial features of the user and the pre-entered facial features of the preset user are compared to confirm whether the two are consistent. Since the facial features of each user are different, the recognition of the user may be performed by the facial features. In the process of face recognition and determination, the image may be collected by an image collection device, such as an electronic eye, provided on the transmitting side, and then the collected image may be transmitted to an information processor for image recognition and determination.

In still other examples, action features of the person who utters the voice information are obtained, and it is determined whether the action features are consistent with the action features of the preset user. Specifically, when performing the determination, the action of the user currently in front of the transmitting side may be obtained by an image collection device, such as an electronic eye, a pickup camera, or the like, provided on the transmitting side, and then the obtained image may be transmitted to the information processor for action recognition to determine whether the current user is the preset user. Before performing the determination, the action or gesture for determination may be pre-entered by a preset user such as the owner. In this way, the recognition of the preset user may be performed by the action recognition, which not only ensures the accuracy of the determination result, but also avoids the situation that the preset user such as the owner inadvertently triggers the voice communication, reduces the unnecessary voice transmission, and improves the accuracy of the voice communication.

It should be noted that, in the above three determination manners, any one of the above manners may be selected according to actual needs. Certainly, in order to further ensure the accuracy of the determination result, the above manners may also be combined. The combinations of the manners are not specifically limited herein, and may be selected according to actual needs.

303. If the transmitting side determines that the voice information is uttered by the preset user, the voice information is transmitted to the receiving side; otherwise, the voice information is not transmitted.

In the embodiment of the present disclosure, after the determination of step 302, there are two kinds of results, one of which is that the current voice information is not uttered by the preset user, and the second is that the current voice information is uttered by the preset user.

When it is determined that the voice information is not uttered by the preset user, it may be determined that it is not the preset user who is currently emitting the voice, and that the voice information is not required to be transmitted. Optionally, a reminder voice may also be transmitted to the receiving side to alert the recipient. In this way, the problem of voice information leakage caused by other people impersonating the owner for voice communication may be avoided, and the security of the voice communication described in the embodiment of the present disclosure may be improved.

When it is determined that the voice information is uttered by the preset user, it is indicated that the voice information needs to be transmitted to the receiving side and therefore, the current voice information may be transmitted to the corresponding receiving side by a transmitting device according to the present step of the method.

Further, when the voice communication according to the embodiment of the present disclosure is performed by the user, the voice information may be interfered by the ambient noise. Therefore, in the embodiment of the present disclosure, before the voice information is transmitted to the receiving side, the voice environment in which the transmitting side is located may be obtained, corresponding optimization processing on the voice information may be performed according to the voice environment, and the optimized voice information may be transmitted to the receiving side. The specific process may be as follows. The voice environment in which the transmitting side is located is obtained, and according to the obtained voice environment, it is determined whether there is noise in the vicinity of the transmitting side and the volume of the noise is determined when there is noise. Then, optimization processing on the voice information may be performed based on the voice environment in which the transmitting side is located. When obtaining the voice environment in which the transmitting side is located, the obtaining process may be based on a microphone provided at the transmitting side or on a device such as an electronic ear provided separately at the transmitting side for collecting environmental information. Specifically, the collection mode may be selected according to the actual needs. Meanwhile, the specific manner for optimizing the voice information may include: performing volume change processing on the voice information and performing noise reduction processing on the voice information. Here, the specific way to change the volume includes increasing the volume or lowering the volume. For example, when it is detected that the external noise is large, the current voice information may be subjected to noise reduction processing, and the volume of the voice information may be appropriately increased, thereby ensuring that the voice user can obtain a more accurate voice information when the voice is output.

304: The receiving side receives the voice information transmitted from the peer device.

In the embodiment of the present disclosure, the voice information is transmitted by the above-mentioned transmitting side. Therefore, the peer device that the receiving side receives the voice information from in this step is actually the transmitting side in the foregoing steps in the embodiment of the present disclosure. Therefore, after the collected voice information is transmitted at the transmitting side, it may be received at the receiving side according to the present step of the method. In the process of receiving the voice information at the receiving side, any mode may be selected as the receiving mode, and certainly, it is necessary to ensure that the receiving mode of voice information at the receiving side matches the transmitting mode at the transmitting side, so as to avoid the loss of data.

305. The receiving side collects the first environment information, and determines whether the first environment information meets a voice output condition.

In the embodiment of the present disclosure, in order to ensure that the case where others eavesdrop or others impersonate the owner of the apparatus is avoided when the user receives the voice information, in this step, the current environment at the receiving side needs to be detected to determine whether the condition for outputting the voice information is met.

In the embodiment of the present disclosure, the first environment information may be actually understood as the information about the environment in which the receiving side is located before the voice output is performed, and determining whether the first environment information meets the voice output condition may be performed as follows.

In some examples, it is determined whether there is only one voice recipient. Generally speaking, in the process of making a voice call, there may be a situation in which the user has other people around when receiving the voice. In order to ensure that the voice information is not obtained by others, it is necessary to determine the number of recipients currently in front of the receiving side. When there is more than one recipient, it means that there are other people besides the preset user, such as the owner, and the current environment does not meet the voice output condition. Specifically, the process of performing the determination may be performed by an image collection device, such as a pickup camera, an electronic eye, or the like, provided at the receiving side. The process of performing the determination may be performed by collecting images from the user currently in front of the receiving side, and identifying whether there is only one user.

In other examples, it is determined whether facial features of a voice recipient are consistent with facial features of a preset receiving user. Since each individual's facial features are different, the identity of the user can be recognized based on the face image recognition. Therefore, the image of the user in front of the receiving side may be collected by the image collection device provided at the receiving side, and then sent to the corresponding information processor for image extraction. After the facial features are extracted, the features are compared with the pre-entered facial features of the preset user, thus realizing the recognition function of the voice recipient.

In still other examples, it is determined whether distances from other users than a voice recipient to the voice recipient exceed a preset threshold. In the embodiment of the present disclosure, since other people may be present around the preset receiving user of the voice communication when the voice information is output, based on the principle of sound wave transmission, when the voice is output, it is necessary to avoid eavesdropping by other people. Therefore, the positions of the persons other than the current voice recipient may be collected by the image collection device provided at the receiving side, and then the distances may be calculated by the computing device. Then the distances from other users may be compared with a preset distance threshold by a preset processor. When it is determined that there are other users that have theirs distances smaller than the preset threshold value, it means that there are other users close to the receiving side in the vicinity of the actual voice information recipient, so that there may be a risk that the voice may be tapped by others after the voice is output. In this way, by comparing the distances from other users than the voice recipient to the voice recipient with the preset threshold, it is possible to avoid the situation that there are other users close to the receiving side and thus the voice is eavesdropped, thereby ensuring the accuracy of the voice communication.

In the above three determination manners, any one of the above manners may be selected according to actual needs. Certainly, in order to further ensure the accuracy of the determination result, the above manners may also be combined. The combinations of the manners are not specifically limited herein, and may be selected according to actual needs. For example, the three manners described above may be combined as follows. When the receiving side receives the voice information, it may first determine the number of users in front of the receiving side, and when there is only one user, it may determine whether the facial features of the current user are consistent with the facial features of the preset user. When it is determined that the facial features of the two are consistent, it is further determined whether the distances from other users in the vicinity exceed the preset threshold in addition to the current user. In this way, it is possible to determine whether the current environment meets the voice output condition by the number of voice recipients, the facial features, and the distances from others around, and it is possible to more reliably ensure the security of the voice information output.

306. If the receiving side determines that the first environment information meets a voice output condition, the voice information is output, and otherwise, the voice information is not output.

During the process of outputting the voice information, there may be situations that affect the security of voice communication at any time. For example, when someone else comes near the receiving side that is outputting the voice information, there may be situations where the voice information being output is heard by others. Therefore, in order to further improve the security of the voice communication during the process of outputting the voice information, the second environment information may be collected when the voice information is output. The second environment information may be understood as the information about the environment in which the receiving side is located during the process of outputting the voice information. Therefore, the output of the voice information is stopped if it is determined that the second environment information does not meet a voice output condition. Optionally, the output of the voice information is stopped, and the output is switched to a preset voice, which may be a voice preset within the system or pre-recorded by the user and is independent of the voice communication. In this way, when the external environment changes, other people cannot obtain the voice communication that the user is in progress.

Alternatively, an interference superimposed voice may be outputted if it is determined that the second environment information does not meet a voice output condition, the interfering superimposed voice being a voice in which interfering audio is superimposed in the voice information. In this way, while ensuring that the user can receive the voice information, the other people can only receive the interference voice, thus avoiding the safety problem of the voice communication caused by the voice leakage.

Further, in the output process of the voice information according to the embodiment of the present disclosure, in order to enable the output voice to be compatible with the environment, the output volume of the voice information may be controlled before outputting the voice, according to the environment information in which the receiving side is located obtained before the output. That is, the output volume of the voice information is adjusted according to the first environment information, and then the adjusted voice information is outputted. In this way, it is ensured that, when the external environment before the receiving side outputs the voice is quiet, the voice information can be outputted at a lower volume, thus avoiding being obtained by others and improving the security of voice communication. In contrast, when the external environment before the receiving side outputs the voice is noisy, the voice information can be outputted at a higher volume, thus reducing the external interference when the user receives the voice information.

Figure 4:
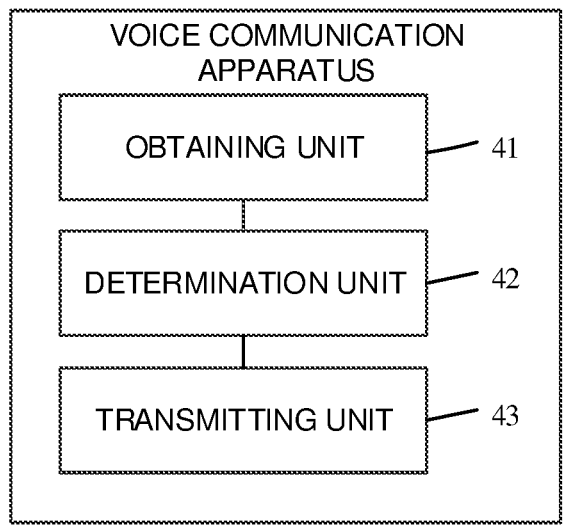
FIG. 4 illustrates a composition block diagram of a voice communication apparatus according to an embodiment of the present disclosure.

An embodiment of the present disclosure further provides a voice communication apparatus applied to a transmitting side. As shown in FIG. 4, the apparatus mainly includes an obtaining unit 41, a determination unit 42, and a transmitting unit 43.

The obtaining unit 41 may be configured to obtain voice information;

the determination unit 42 may be configured to determine whether the voice information obtained by the obtaining unit 41 is uttered by a preset user;

the transmitting unit 43 may be configured to transmit the voice information to a receiving side if it is determined, by the determination unit 42, that the voice information is uttered by a preset user, and not transmit the voice information if it is determined, by the determination unit 42, that the voice information is not uttered by a preset user.

Figure 5:
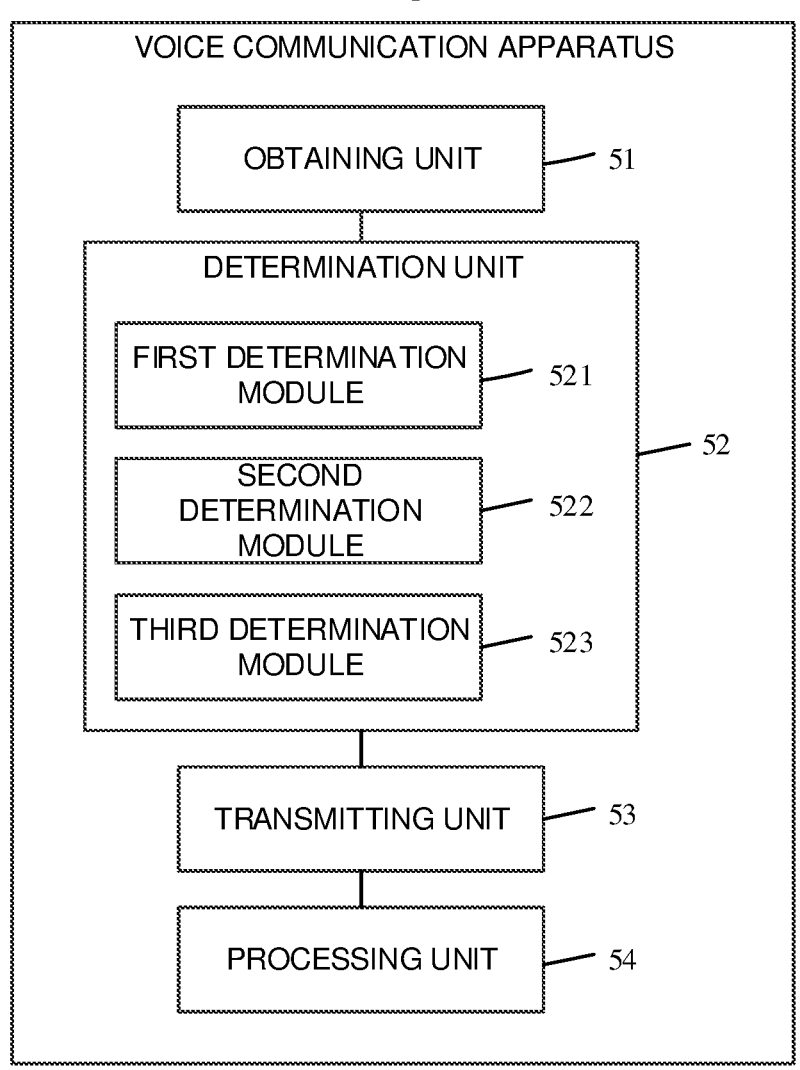
FIG. 5 illustrates a composition block diagram of another voice communication apparatus according to an embodiment of the present disclosure.

Another embodiment of the present disclosure further provides a voice communication apparatus applied to a transmitting side. As shown in FIG. 5, the apparatus mainly includes an obtaining unit 51, a determination unit 52, and a transmitting unit 53.

The obtaining unit 51 may be configured to obtain voice information;

the determination unit 52 may be configured to determine whether the voice information obtained by the obtaining unit 51 is uttered by a preset user;

the transmitting unit 53 may be configured to transmit the voice information to a receiving side if it is determined, by the determination unit 52, that the voice information is uttered by a preset user, and not transmit the voice information if it is determined, by the determination unit 52, that the voice information is not uttered by a preset user.

Optionally, the obtaining unit 51 may be further configured to obtain facial features and action features of a person who utters the voice information;

the determination unit 52 includes:

a first determination module 521 that may be configured to determine whether audio features of the voice information are consistent with audio features of a preset user;

a second determination module 522 that may be configured to determine whether the facial features are consistent with the facial features of a preset user;

a third determination module 523 that may be configured to determine whether the action features are consistent with action features of a preset user.

Optionally, the apparatus further includes:

a processing unit 54 that may be configured to obtain a voice environment in which the transmitting side is located, and perform optimization processing on the voice information according to the voice environment in which the transmitting side is located, wherein the optimization processing includes volume changing and noise reduction processing;

the transmitting unit 53 may be further configured to transmit the voice information optimized by the processing unit 54 to the peer device.

Figure 6:
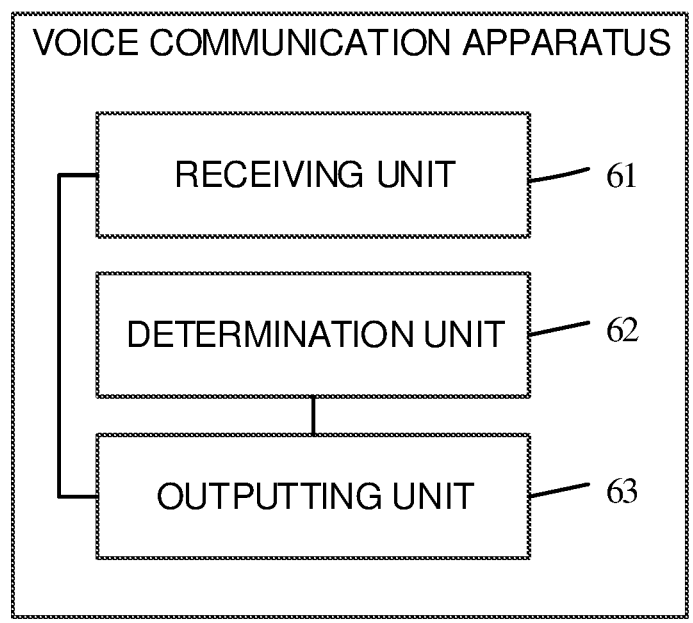
FIG. 6 illustrates a composition block diagram of still another voice communication apparatus according to an embodiment of the present disclosure.

Further, according to the above method embodiment, an embodiment of the present disclosure provides a voice communication apparatus applied to a receiving side. As shown in FIG. 6, the apparatus mainly includes a receiving unit 61, a determination unit 62, and an outputting unit 63.

The receiving unit 61 may be configured to receive voice information transmitted from a peer device;

the determination unit 62 may be configured to collect a first environmental information, and determine whether the first environmental information meets a voice output condition;

the outputting unit 63 may be configured to output the voice information received by the receiving unit 61 if it is determined, by the determination unit 62, that the first environment information meets a voice output condition, and not output the voice information received by the receiving unit 61 if it is determined, by the determination unit 62, that the first environment information does not meet the voice output condition.

Figure 7:
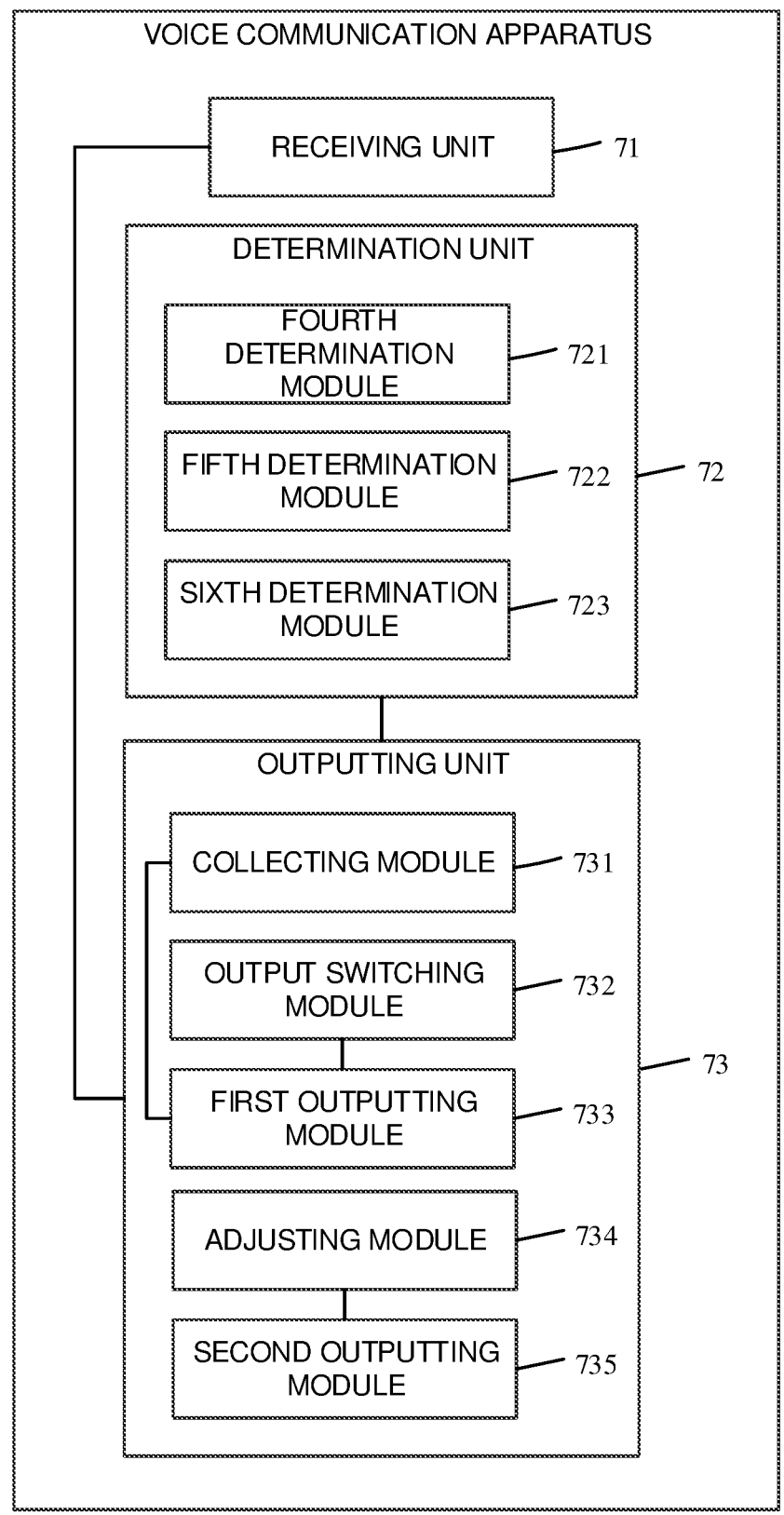
FIG. 7 illustrates a composition block diagram of yet another voice communication apparatus according to an embodiment of the present disclosure.

Further, according to the above method embodiment, another embodiment of the present disclosure provides a voice communication apparatus applied to a receiving side. As shown in FIG. 7, the apparatus mainly includes a receiving unit 71, a determination unit 72, and an outputting unit 73.

The receiving unit 71 may be configured to receive voice information transmitted from a peer device;

the determination unit 72 may be configured to collect a first environmental information, and determine whether the first environmental information meets a voice output condition;

the outputting unit 73 may be configured to output the voice information received by the receiving unit 71 if it is determined, by the determination unit 72, that the first environment information meets a voice output condition, and not output the voice information received by the receiving unit 71 if it is determined, by the determination unit 72, that the first environment information does not meet the voice output condition.

Optionally, the determination unit 72 includes:

a fourth determination module 721 that may be configured to determine whether there is only one voice recipient;

a fifth determination module 722 that may be configured to determine whether facial features of a voice recipient are consistent with facial features of a preset receiving user;

a sixth determination module 723 that may be configured to determine whether distances from other users than a voice recipient to the voice recipient exceed a preset threshold.

Optionally, the outputting unit 73 includes:

a collecting module 731 that may be configured to collect a second environment information when outputting the voice information;

an output switching module 732 that may be configured to stop outputting the voice information and switch to outputting a preset voice if it is determined that the second environment information collected by the collecting module 731 does not meet a voice output condition;

a first outputting module 733 that may be configured to output an interference superimposed voice if it is determined, by the collecting module 731, that the second environment information collected does not meet a voice output condition, the interfering superimposed voice being a voice in which interfering audio is superimposed on the voice information.

Optionally, the outputting unit 73 further includes:

an adjusting module 734 that may be configured to adjust output volume of the voice information according to the first environment information;

a second outputting module 735 that may be configured to output the adjusted voice information.

Figure 8:
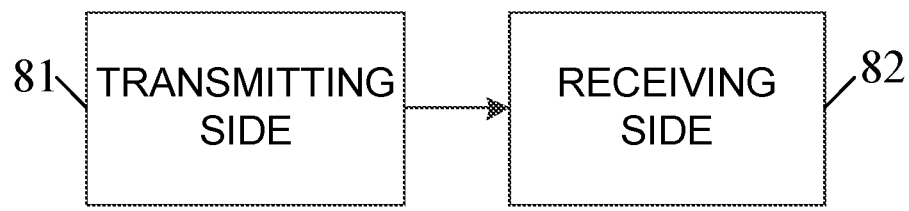
FIG. 8 illustrates a composition block diagram of a voice communication system according to an embodiment of the present disclosure.

Further, according to the above method embodiment, another embodiment of the present disclosure provides a voice communication system. As shown in FIG. 8, the system mainly includes a transmitting side 81 and a receiving side 82;

the transmitting side 81 may be configured to obtain voice information, determine whether the voice information is uttered by a preset user, and transmit the voice information to the receiving side 82 if it is determined that the voice information is uttered by a preset user, and not transmit the voice information otherwise;

the receiving side 82 may be configured to receive the voice information transmitted from the transmitting side 81, collect a first environmental information, determine whether the first environmental information meets a voice output condition, output the voice information if it is determined that the first environmental information meets the voice output condition, and not output the voice information otherwise.

Figure 9:
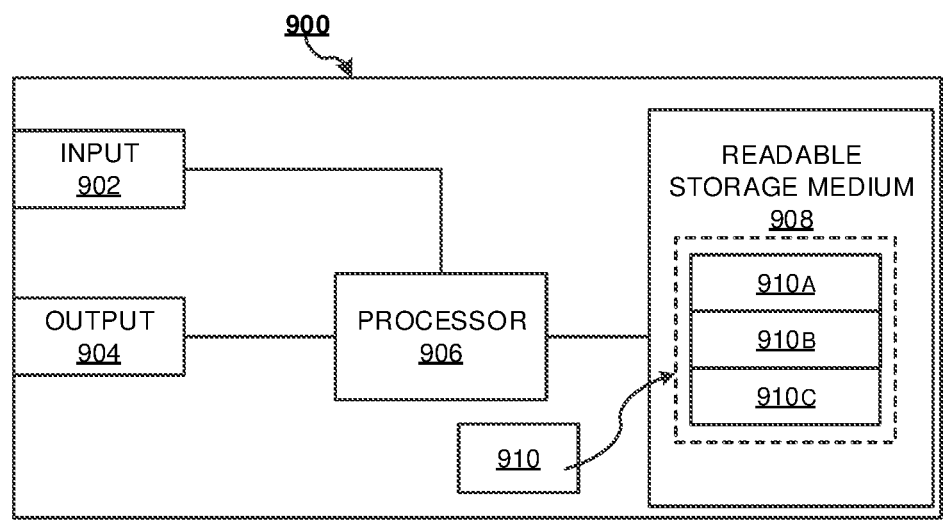
FIG. 9 illustrates a hardware arrangement diagram of an electronic device according to an embodiment of the present disclosure.

FIG. 9 is a block diagram illustrating a hardware arrangement 900 of the voice communication apparatus shown in FIGS. 4-7, in accordance with an embodiment of the present disclosure. The hardware arrangement 900 includes a processor 906 (for example, a digital signal processor (DSP), a central processing unit (CPU), and the like). The processor 906 may be a single processing unit or a plurality of processing units for performing different actions of the flows described herein. The arrangement 900 may also include an input unit 902 for receiving signals from other entities, and an output unit 904 for providing signals to other entities. The input unit 902 and the output unit 904 may be arranged as a single entity or as separate entities. In some embodiments, the input unit 902 may include various sensors, such as a sound sensor, an image sensor, or any other sensor. In some embodiments, the sound sensor may include, for example, a microphone, an electronic ear, or the like. In some embodiments, the image sensor may include, for example, a camera, an electronic eye, a pickup camera, and the like. In some embodiments, the output unit 904 may include sound output devices such as a loudspeaker, a speaker, a headphone, and the like. Moreover, in some embodiments, the input unit 902 and/or the output unit 904 may also be an interface for communicating with devices such as external sensors, sound output devices, and the like. In other words, in these embodiments, the voice communication apparatus itself may not include these components, but rather communicates with external components through interfaces and implements the same or similar functions.

Moreover, in some embodiments, the input unit 902 and the output unit 904 may also include communicators for the processor 906 to communicate with the external, such as a wireless communication unit, a wired communication unit, and the like. The wireless communication unit may be a communication module that supports protocols such as Wi-Fi, Bluetooth, 3GPP series (including, for example, GSM, GPRS, CDMA, WCDMA, CDMA2000, TD-SCDMA, LTE, LTE-A, 5G NR, and the like), Wi-Max, and the like. The wired communication unit may be a communication module that supports protocols such as Ethernet, USB, fiber optics, xDSL, and the like. In some embodiments, the input unit 902 and/or the output unit 904 may also be an interface that is communicatively coupled to an external communicator. In other words, in these embodiments, the voice communication apparatus itself may not include a communicator, but rather communicates with an external communicator via an interface and implements the same or similar functions.

Moreover, the arrangement 900 may include at least one readable storage medium 908 in the form of a non-volatile or volatile memory, such as an electrically erasable programmable read only memory (EEPROM), a flash memory, and/or a hard drive. The readable storage medium 908 includes a computer program 910 that includes codes/computer readable instructions that, when executed by the processor 906 in the arrangement 900, cause the hardware arrangement 900 and/or the device including the hardware arrangement 900 to perform the flow as described above in connection with FIGS. 1-3 and any variations thereof.

The Computer program 910 may be configured as computer program codes having the architecture of computer program modules 910A-910C, for example. Accordingly, in an example embodiment when the hardware arrangement 900 is used in a voice communication device, for example, as a transmitting side, the codes in the computer program of the arrangement 900 may include: a module 910A for obtaining voice information; a module 910B for determining whether the voice information is uttered by a preset user; and a module 910C for transmitting the voice information to a peer device if the voice information is uttered by a preset user, and not transmitting the voice information if not.

Further, in an example embodiment when the hardware arrangement 900 is used in a voice communication device, for example, as a receiving side, the codes in the computer program of the arrangement 900 may include: a module 910A for receiving voice information transmitted from a peer device; a module 910B for collecting a first environment information, and determining whether the first environment information meets a voice output condition; and a module 910C for outputting the voice information if the first environment information meets the voice output condition, and not outputting the voice information if not.

The computer program modules may substantially perform the various actions in the flows illustrated in FIG. 1-FIG. 3 to simulate a voice communication apparatus. In other words, when different computer program modules are executed in the processor 906, they may correspond to different units or modules in the voice communication apparatus as the transmitting side, the voice communication apparatus as the receiving side, or both.

Although the code means in the embodiment disclosed above in connection with FIG. 9 is implemented as a computer program module that, when executed in the processor 906, causes the hardware arrangement 900 to perform the actions described above in connection with FIGS. 1-3, however in alternative implementations, at least one of the code means may be implemented at least partially as a hardware circuit.

The processor may be a single CPU (Central Processing Unit), but may also include two or more processing units. For example, the processor may include a general purpose microprocessor, an instruction set processor, and/or a related chip-set and/or a special purpose microprocessor (for example, an application specific integrated circuit (ASIC)). The processor may also include an on-board memory for caching purposes. The computer program may be carried by a computer program product connected to the processor. The computer program product may include a computer readable medium having stored thereon a computer program. For example, the computer program product may be flash memory, random access memory (RAM), read only memory (ROM), and EEPROM, and the computer program modules described above may be distributed to different computer program products in the form of memory within the UE in alternative embodiments.

The embodiment of the present disclosure provides a voice communication method, a voice communication apparatus, and a voice communication system including a transmitting side and a receiving side, by using the solution described in the foregoing embodiments. The transmitting side obtains voice information and determines whether the voice information is uttered by a preset user, transmits the voice information when it is determined that the voice information is uttered by the preset user, and does not transmit the voice information otherwise. In this way, the identity of the person who utters the voice information may be confirmed at the transmitting side, thus the security of voice communication process may be ensured as a whole. Meanwhile, the receiving side obtains the first environment information, determines whether the voice output condition is met, outputs the voice information when the voice output condition is met, and does not output the voice information otherwise. In this way, it is possible to determine, at the receiving side, whether the current environment meets the voice output condition when the voice information is to be output, and then to output the voice information when the current environment meets the voice output condition, which can avoid the possibility that the voice information is obtained by others, and then ensure the security of the whole voice communication process.

Further, by determining, at the transmitting side, whether the audio features of the voice information are consistent with the audio features of the preset user, it is possible to determine whether the voice information obtained by the transmitting side is uttered by the preset user in the way of audio features. Meanwhile, by obtaining the facial features of the person who utters the voice information and determining whether the facial features are consistent with the facial features of the preset user, it is possible to determine whether the voice information is uttered by the preset user in the way of facial features. Moreover, by obtaining the action features of the person who utters the voice information and determining whether the action features are consistent with the action features of the preset user, it is possible to determine whether the voice information is uttered by the preset user in the way of action features, and to avoid the situation that the preset user such as the owner inadvertently triggers the voice communication, and reduce the unnecessary voice transmission. Moreover, before transmitting the voice information, optimization processing on the voice information may be performed, and the optimized voice information may be transmitted to the receiving side. Thereby, the volume of the voice information can be controlled. It also reduces the noise interference in the voice information and ensures the accuracy of the voice information in the voice communication.

In addition, at the receiving side, by determining whether there is only one voice recipient, determining whether the facial features of the voice recipient are consistent with those of the preset receiving user, and determining whether distances from other users than the voice recipient to the voice recipient exceed a preset threshold, it can be ensured that only the real user can receive the voice information when the voice is output, thus avoiding the situation that others impersonate the user or eavesdrop nearby, and improving the security of the voice communication. Furthermore, by collecting a second environment information when outputting the voice information, and stopping outputting the voice information and switching to outputting a preset voice if it is determined that the second environment information does not meet a voice output condition, it can be ensured that when other people eavesdrop in the process of voice information output, the output of the voice information may be stopped in time and other voice independent of the voice information may be outputted, thus avoiding the possibility of being eavesdropped. In addition, an interference superimposed voice may be outputted if it is determined that the second environment information does not meet the voice output condition. In this way, while ensuring that the real recipient can receive the voice information, the other user can only receive the interference voice, so that the user can receive the voice information while avoiding the possibility of being eavesdropped by others, and then the security of the voice communication may be improved. Moreover, by adjusting output volume of the voice information according to the first environment information and outputting the adjusted voice information, it can be ensured that the output voice information is compatible with the background volume in the environment. Thus, when the environment is noisy, the voice information can be outputted at a higher volume, so that the user can obtain accurate voice information, and when the environment is relatively quiet, the voice information can be outputted at a lower volume, thereby reducing the probability of being eavesdropped by others, and improving the accuracy of voice communication.

Further, according to the above method embodiment, another embodiment of the present disclosure further provides a storage medium storing a computer program adapted to be loaded by a processor and perform the aforementioned voice communication method.

The computer program in the voice communication storage medium provided by the embodiment of the present disclosure, when executed by a processor, may obtain voice information at the transmitting side and determine whether the voice information is uttered by a preset user, transmit the voice information when it is determined that the voice information is uttered by the preset user, and not transmit the voice information otherwise. In this way, the identity of the person who utters the voice information may be confirmed at the transmitting side, thus the security of voice communication process may be ensured as a whole. Meanwhile, the computer program, when executed by a processor, may further obtain the first environment information at the receiving side, determine whether the voice output condition is met, output the voice information when the voice output condition is met, and not output the voice information otherwise. In this way, it is possible to determine, at the receiving side, whether the current environment meets the voice output condition when the voice information is to be output, and then to output the voice information when the current environment meets the voice output condition, which can avoid the possibility that the voice information is obtained by others, and then ensure the security of the whole voice communication process.

In the above embodiments, the descriptions of each embodiment have their own emphasis, and the sections that are not detailed in a certain embodiment may be referred to the related descriptions of other embodiments.

It will be appreciated that related features in the above methods and apparatus may be referenced to each other. In addition, "first", "second", and the like in the above embodiments are used to distinguish the embodiments, and do not represent the advantages and disadvantages of the embodiments.

A person skilled in the art may clearly understand that, for the convenience and brevity of the description, the specific working process of the system, the apparatus and the unit described above may refer to the corresponding process in the foregoing method embodiment, and details are not described herein again.

In the description provided herein, numerous specific details are set forth. However, it is understood that the embodiments of the present disclosure may be practiced without these specific details. In some instances, well-known methods, structures, and techniques are not shown in detail so as not to obscure the understanding of the description.

Similarly, it is understood that, in order to simplify the present disclosure and to help understand one or more of the various aspects, in the above description of the exemplary embodiments of the present disclosure, the various features of the present disclosure are sometimes grouped together into a single embodiment, figure, or a description thereof. However, the method disclosed is not to be interpreted as reflecting the intention that the present disclosure of the claimed invention requires more features than those specifically recited in the claims. Rather, as disclosed in the following claims, the disclosed aspects are less than all features of the single embodiments disclosed herein. Therefore, the claims which follow the specific embodiments are hereby explicitly incorporated into the specific embodiments, and each of the claims serves as a separate embodiment of the present disclosure.

Those skilled in the art will appreciate that the modules in the devices of the embodiments can be adaptively changed and placed in one or more devices different from the embodiment. The modules or units or components of the embodiments may be combined into one module or unit or component, and further they may be divided into a plurality of sub-modules or sub-units or sub-components. With the exception of at least some of such features and/or processes or units that are mutually exclusive, all features disclosed in the specification, including the accompanying claims, the abstract and the drawings, and all processes or units of any methods or devices so disclosed, may be combined by any combination. Unless otherwise expressly stated, each feature disclosed in this specification (including the accompanying claims, the abstract and the drawings) may be replaced by alternative features that provide the same, equivalent or similar purpose.

In addition, those skilled in the art will appreciate that, although some embodiments described herein include certain features, rather than some other features, which are included in other embodiments, combinations of features of different embodiments are intended to be within the scope of the present disclosure and form different embodiments. For example, in the following claims, any one of the claimed embodiments may be used in any combination.

Various component embodiments of the present disclosure may be implemented in hardware, or in a software module running on one or more processors, or in a combination thereof. Those skilled in the art will appreciate that a microprocessor or digital signal processor (DSP) may be used in practice to implement some or all of the functionality of some or all of the components of the voice communication method and apparatus in accordance with embodiments of the present disclosure. The present disclosure may also be implemented as a device or apparatus program (for example, a computer program and a computer program product) for performing some or all of the methods described herein. Such a computer program implementing the present disclosure may be stored on a computer readable medium or may be in the form of one or more signals. Such signals may be downloaded from an Internet website, provided on a carrier signal, or provided in any other form.

It should be noted that the above-described embodiments are illustrative of the present disclosure and are not intended to limit the scope of the disclosure, and those skilled in the art may devise alternative embodiments without departing from the scope of the appended claims. In the claims, any reference signs placed between parentheses shall not be construed as a limitation. The word "comprising" does not exclude the presence of the elements or steps that are not recited in the claims. The word "a", "an" or "one" before the element does not exclude the presence of a plurality of such elements. The present disclosure may be implemented by means of hardware comprising several distinct elements and by means of a suitably programmed computer. In the unit claims enumerating several means, several of these means can be embodied by the same hardware item. The use of the words first, second, and third does not indicate any order. These words can be interpreted as names.

We claim:

1. A method for improving security of voice communication at a voice communication apparatus on a transmitting side, the method comprising:
    obtaining voice information;
    determining whether the voice information is uttered by a preset user;
    in response to determining that the voice information is uttered by the preset user:
        determining a voice environment in which the voice communication apparatus on the transmitting side is located;
        performing optimization processing on the voice information according to the voice environment; and
        transmitting the optimized voice information to a peer device; and
    in response to determining that the voice information is not uttered by the preset user, prohibiting the transmission of the voice information,
    wherein the step of performing optimization processing on the voice information according to the voice environment comprises:
        determining whether there is noise in the vicinity of the voice communication apparatus on the transmitting side according to the obtained voice environment;
        determining the volume of the noise when there is noise; and
        performing a noise reduction processing on the voice information and increasing the volume of the voice information when the volume of the noise is greater than a threshold, and
    wherein the step of determining whether the voice information is uttered by a preset user comprises one or more of the steps of:
        obtaining facial features of a person who utters the voice information, and determining whether the facial features are consistent with facial features of the preset user; or
        obtaining action features of the person who utters the voice information, and determining whether the action features are consistent with action features of the preset user.

2. The method of claim 1, wherein the step of determining whether the voice information is uttered by a preset user further comprises:
    determining whether audio features of the voice information are consistent with audio features of the preset user.

3. A method for improving security of voice communication at a voice communication apparatus on a receiving side, the method comprising:
    receiving voice information transmitted from a peer device;
    collecting first environmental information of the voice communication apparatus on the receiving side;
    determining whether the first environmental information meets a voice output condition;
    in response to determining that the first environmental information meets the voice output condition, outputting the voice information; and
    in response to determining that the first environmental information does not meet the voice output condition, prohibiting the output of the voice information,
    wherein the step of determining whether the first environmental information meets the voice output condition comprises one or more of the steps of:
        determining whether there is only one voice recipient;
        determining whether facial features of the voice recipient are consistent with facial features of a preset receiving user; or
        determining whether distances from other users than the voice recipient to the voice recipient exceed a preset threshold.

4. The method of claim 3, wherein the step of outputting the voice information comprises:
    collecting second environment information when the voice information is output; and
    in response to determining that the second environment information does not meet a voice output condition, stopping outputting the voice information or switching to outputting a preset voice.

5. The method of claim 4, wherein the step of outputting the voice information comprises:
    in response to determining that the second environmental information does not meet the voice output condition, outputting an interference superimposed voice, the interference superimposed voice being a voice in which interfering audio is superimposed on the voice information.

6. The method of claim 3, wherein the step of outputting the voice information comprises:
    adjusting output volume of the voice information according to the first environment information, and outputting the adjusted voice information.

7. A voice communication apparatus on a receiving side for improving security of voice communication, the apparatus comprising:
    a processor;
    a memory storing instructions which, when executed by the processor, cause the processor to perform the method of claim 3.

8. The voice communication apparatus of claim 7, wherein the instructions, when executed by the processor, further cause the processor to collect a second environment information when the voice information is output; and:

in response to determining that the second environment information does not meet a voice output condition, stop outputting the voice information and switch to outputting a preset voice; or in response to determining that the second environmental information does not meet the speech output condition, output an interference superimposed voice, the interference superimposed voice being a voice in which interfering audio is superimposed on the voice information.

9. The voice communication apparatus of claim 7, wherein the instructions, when executed by the processor, further cause the processor to:

adjust output volume of the voice information according to the first environment information; and output the adjusted voice information.

10. A system for improving security of voice communication, the system comprising:

one or more apparatuses for improving security of voice communication comprising:
- a processor; and
- a memory storing instructions which, when executed by the processor, cause the processor to:
  - obtain voice information from a sound sensor;
  - determine whether the voice information is uttered by a preset user;
  - in response to determining that the voice information is uttered by the preset user
    - determine a voice environment in which the voice communication apparatus on the transmitting side is located;
    - perform optimization processing on the voice information according to the voice environment; and
    - transmit, via a communicator, the optimized voice information to a peer device; and
  - in response to determining that the voice information is not uttered by the preset user, prohibit the transmission of the voice information; and, wherein the instructions which, when executed by the processor, further cause the processor to:
- determine whether there is noise in the vicinity of the voice communication apparatus on the transmitting side according to the obtained voice environment;
- determine the volume of the noise when there is noise; and
- perform a noise reduction processing on the voice information and increase the volume of the voice information when the volume of the noise is greater than a threshold, and wherein the instructions which, when executed by the processor, further cause the processor to:
- obtain facial features of a person who utters the voice information, and determine whether the facial features are consistent with facial features of the preset user; or
- obtain action features of the person who utters the voice information, and determining whether the action features are consistent with action features of the preset user; and one or more apparatuses for improving security of voice communication according to claim 7.

11. A voice communication apparatus on a transmitting side for improving security of voice communication, the apparatus comprising:

a processor; and a memory storing instructions which, when executed by the processor, cause the processor to:
- obtain voice information from a sound sensor;
- determine whether the voice information is uttered by a preset user;
- in response to determining that the voice information is uttered by the preset user;
  - determine a voice environment in which the voice communication apparatus on the transmitting side is located;
  - perform optimization processing on the voice information according to the voice environment; and
  - transmit, via a communicator, the optimized voice information to a peer device; and
- in response to determining that the voice information is not uttered by the preset user, prohibit the transmission of the voice information, wherein the instructions which, when executed by the processor, further cause the processor to:
- determine whether there is noise in the vicinity of the voice communication apparatus on the transmitting side according to the obtained voice environment;
- determine the volume of the noise when there is noise; and
- perform a noise reduction processing on the voice information and increase the volume of the voice information when the volume of the noise is greater than a threshold, and wherein the instructions which, when executed by the processor, further cause the processor to:
- obtain facial features of a person who utters the voice information, and determine whether the facial features are consistent with facial features of the preset user; or
- obtain action features of the person who utters the voice information, and determining whether the action features are consistent with action features of the preset user.

12. The voice communication apparatus of claim 11, wherein the instructions, when executed by the processor, further cause the processor to perform the operations of:

determining whether audio features of the voice information are consistent with audio features of the preset user.

* * * * *